United States Patent [19]
Kameda

[11] Patent Number: 5,003,347
[45] Date of Patent: Mar. 26, 1991

[54] OPENING-CLOSING MECHANISM FOR AUTOMATIC DOCUMENT FEEDER

[75] Inventor: Kiyoshige Kameda, Higashiosaka, Japan

[73] Assignee: Mita Industrial Co., Ltd., Osaka, Japan

[21] Appl. No.: 438,294

[22] Filed: Nov. 16, 1989

[30] Foreign Application Priority Data

Nov. 26, 1988 [JP] Japan .................................. 63-298496

[51] Int. Cl.⁵ ............................................. G03B 27/62
[52] U.S. Cl. ........................................ 355/75; 355/72; 355/25
[58] Field of Search ....................... 355/75, 25, 47, 72; 352/72

[56] References Cited

U.S. PATENT DOCUMENTS

| T920,009 | 3/1974 | Kosarko | 352/72 |
| 1,962,031 | 6/1934 | Porter | 352/72 |
| 2,339,202 | 1/1944 | Stechbart | 352/72 |
| 3,601,335 | 8/1971 | Dopkins et al. | 352/72 |
| 4,853,750 | 8/1989 | Murata et al. | 355/75 |

Primary Examiner—Monroe H. Hayes
Attorney, Agent, or Firm—Jordan and Hamburg

[57] ABSTRACT

A mechanism for opening and closing an automatic document feeder comprising a body-side support portion having a post removably insertable into a mount cavity in the body of an apparatus, a feeder-side support portion biased upward by a coiled spring, a pivot pivotally movably supporting the feeder-side support portion on the body-side support portion, positioning means for determining the distance between the pivot and the body, and adjusting means for varying the distance determined by the positioning means.

5 Claims, 6 Drawing Sheets

OPENING-CLOSING MECHANISM FOR AUTOMATIC DOCUMENT FEEDER

BACKGROUND OF THE INVENTION AND RELATED ART STATEMENT

The present invention relates to an opening-closing mechanism for use with image forming apparatus such as copying machines and facsimile systems.

Image forming apparatus such as copying machines and facsimile systems are known which are equipped with an openable automatic document feeder (hereinafter referred to as "ADF"). Opening-closing mechanisms for ADFs include those which are easily attachable to and removable from the body of the image forming apparatus.

Such an opening-closing mechanism for ADFs will be described with reference to FIGS. 4 and 5 which are side elevations in section. The opening-closing mechanism 1 comprises a body-side support assembly 2', an ADF-side support portion 3 and a spring member 4.

The body-side support assembly 2' has a frame 20, side walls 22 formed by upwardly bending opposite side portions of the frame 20, a post 23, a pivot 24 and a positioning member 29. The post 23 is provided on the bottom of the frame 20. The ADF 7 is mounted on the body 6 of an image forming apparatus by inserting the post 23 into a mount cavity 61 in the body 6. The pivot 24 is provided on the rear portion of the frame 20 for movably supporting the ADF-side support portion 3. The positioning member 29 is fixed to the frame 20 as projected downward from the front end of the frame by a predetermined length so that when the ADF 7 is closed, the document conveyor belt 72 of the ADF 7 is positioned approximately parallel to the body 6.

The ADF-side support portion 3 is secured to an ADF cover 71 inside thereof and supported by the pivot 24 on the frame 20 to render the ADF 7 openable about the pivot 24. The support portion 3 is biased upward, i.e., in the direction to open the ADF 7, by the spring member 4 which has one end held in a cutout 31 and the other end held to the body-side support assembly 2'. The ADF 7 can be opened by lifting a knob 73 at the front end of the cover 71 with a force F of about 1.5 kg W which is small relative to the weight of the ADF 7.

The spring member 4 comprises a coiled spring 41 and holders 42, 43. The holder 43 on the cover side holds one end of the coiled spring 41 and has a lateral projecting pin 44, by which the holder 43 is retained in the cutout 31. The holder 42 holds the other end of the coiled spring 41 and has a lateral projecting pin 45, by which the holder 42 is held to the support assembly 2'. The coiled spring 41 is held in place as compressed by the holders 42, 43 to bias the ADF-side support portion 3 obliquely upward with the spring force. The force of the spring 41 is so determined that when the ADF 7 is opened, for example, through an angle of 60 to 70 degrees, the force of the spring 41 is in balance with the weight of the ADF 7 to hold the ADF 7 at the opened position with this angle.

With the ADF opening-closing mechanism described above, the coiled spring 41 is given a great force for biasing the ADF 7 obliquely upward so as to minimize the force F required to open the ADF 7 and to diminish the impact to be produced when the ADF 7 is closed under gravity. Accordingly, when the ADF 7 is in its closed state in which the force of the spring 41 is greatest, the cover 71 of the ADF 7 warps as shown in FIG. 6. Consequently, one side of the ADF 7 where the opening-closing mechanism 1 is provided will be raised off the glass platen 62, failing to position the document conveyor belt 72 in parallel to the apparatus body 6. It is then likely that the document will not be transported onto the glass platen 62 properly.

This drawback may be overcome by using an iron plate, aluminum plate or like rigid body for the cover 71, whereas the use of iron plate or the like results in an increased weight, which entails the necessity of giving a greater force to the spring 41 and enhanced rigidity to the entire opening-closing mechanism 1 and the problem of an increased cost.

Further when the ADF 7 is in its closed state, the coiled spring 41 biases the holder 42 obliquely downward, subjecting the post 23 to a counterclockwise moment about the pivot 24. The post 23 is inclined forward with its lower end portion pressed against the rear lower portion of the wall defining the mount cavity 61 and with its upper end portion pressed against the front upper portion of the wall further because the front-rear width of the post 23 is made slightly smaller than the inside diameter of the cavity 61 to render the ADF mountable on the body 6 with ease.

With the post 23 thus inclined forward relative to the ADF 7, the ADF 7 is displaced forward from the apparatus body 6 by being pushed forward, with the result that the document to be transported onto the glass platen 62 of the body 6 is also displaced forward.

This objection may be obviated by fastening the rear side of the post 23 to the rear portion of the cavity-defining wall as with screws, but this requires a cumbersome time-consuming procedure, makes the ADF 7 difficult to mount and remove, and necessitates an increased number of parts including the screws and an increased cost.

SUMMARY OF THE INVENTION

The main object of the present invention is to overcome the foregoing problems and to provide at a relatively low cost an ADF opening-closing mechanism which permits proper transport of documents onto the glass platen.

The present invention provides a mechanism for opening and closing an automatic document feeder, the mechanism being characterized in that it comprises a body-side support portion having a post removably insertable into a mount cavity in the body of an apparatus, a feeder-side support portion biased upward by a coiled spring, a pivot pivotally movably supporting the feeder-side support portion on the body-side support portion, positioning means for determining the distance between the pivot and the body, and adjusting means for varying the distance determined by the positioning means.

With the ADF opening-closing mechanism of the above construction, the distance between the pivot and the body as determined by the positioning means is variable by the adjusting means to thereby lower one side of the ADF where the mechanism is provided. This obviates the warp of the ADF that would result when the coiled spring is given an increased force, permitting the document conveyor belt of the ADF to be positioned in parallel to the body for the belt to transport documents onto the glass platen properly The invention further provides a mechanism for opening and closing an automatic document feeder mountable on the body of an apparatus by inserting a post into a mount cavity in the body and biased upward by a coiled spring, the mechanism being characterized in that an elastic member is interposed between the post and the wall of the body defining the mount cavity for pressing the post into contact with the cavity-defining wall.

With the ADF opening-closing mechanism stated above, the post is pressed against the cavity-defining wall when the post is inserted into the mount cavity of the body. Consequently, the ADF is prevented from backlashing although it is easy to removably mount on the body by inserting the post into the cavity. This ensures accurate transport of documents onto the glass platen.

The above and other objects, features and advantages of the present invention will become apparent from the following description with reference to the drawings concerned.

DESCRIPTION OF THE PREFERRED EMBODIMENT

Figure 1:
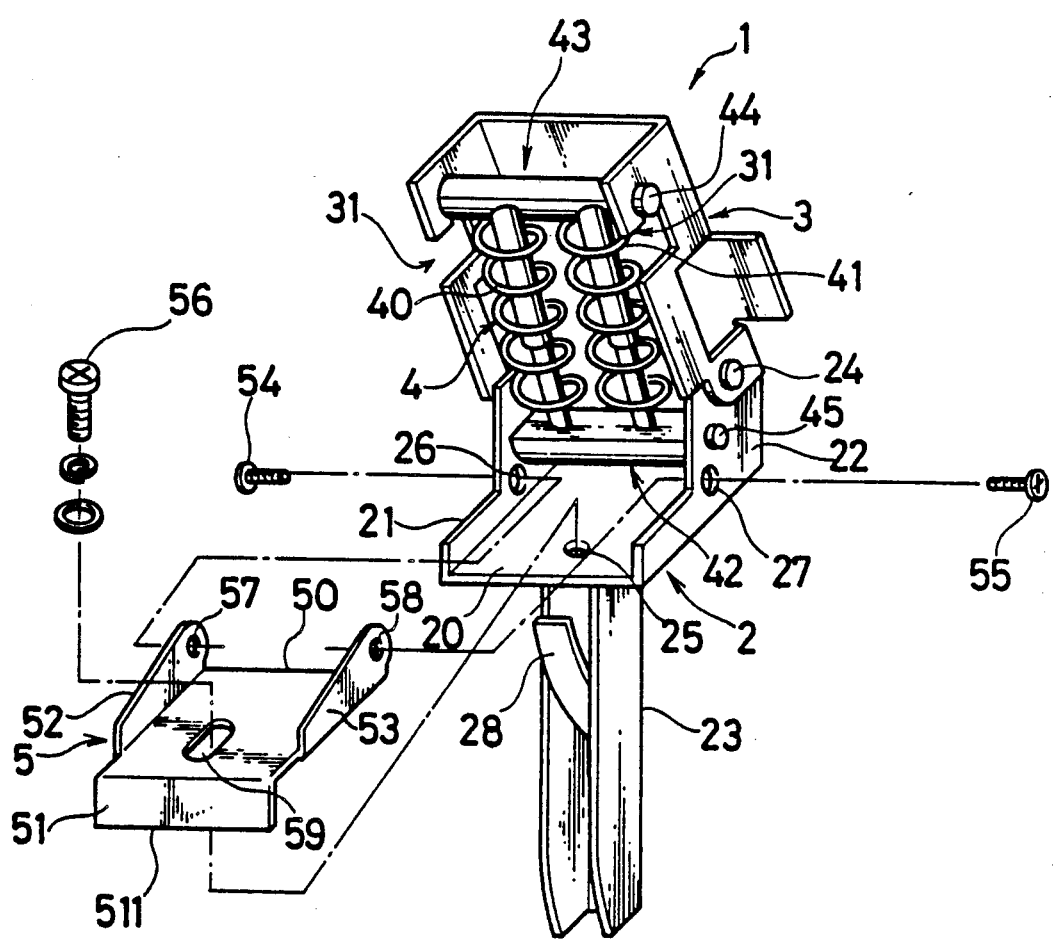
FIG. 1 is an exploded perspective view of an ADF opening-closing mechanism embodying the invention.

FIG. 1 is an exploded perspective view of an ADF opening-closing mechanism embodying the invention. Throughout the drawings, like parts are designated by like reference numerals.

The opening-closing mechanism 1 comprises a body-side support assembly 2, ADF-side support portion 3, spring member 4 and adjusting member 5. The support assembly 2 comprises a frame 20, side walls 21, 22 formed by bending opposite side portions of the frame 20 upward, a post 23 and a pivot 24. The frame 20 is formed at a suitable position with a screw hole 25 which is internally threaded for an adjusting bolt 56 to be screwed in.

The side wall 21 has at a suitable position a screw hole 26 with a diameter larger than the outside diameter of a pivot member 54. The pivot member 54 is loosely passed through the hole 26 and then driven into the screw hole 57 to be described below. The side wall 22 is formed at a suitable position with a screw hole 27 which is internally threaded for a pivot member 55 to be tightly screwed in.

The post 23 is U-shaped in cross section and has its opening directed forward. An ADF 7 is mounted on the body 6 of an apparatus by inserting the post 23 into a mount cavity 61 in the body 6. A plate spring (elastic member) 28 is, for example, U-shaped in section and is secured at its one end to the post 23 inside thereof, with the bulging portion directed downward When the post 23 is inserted into the mount cavity 61, the other end of the plate spring 28 is brought into pressing contact with the front side of the inner wall of the body defining the cavity 61, whereby the ADF 7 is prevented from backlashing.

The adjusting member 5 comprises a base 50, a positioning portion 51 formed by bending the front end portion of the base 50 downward and having a predetermined length, side walls 52, 53 formed by bending opposite side portions of the base 50 upward, the above-mentioned pivot members 54, 55 each in the form of a screw or the like, and the adjusting bolt 56 for connecting the adjusting member 5 to the body-side support assembly 2.

The positioning portion 51 is so formed that the lower end 511 thereof bears on the top surface 63 of the body 6 when the opening-closing mechanism 1 is mounted on the body 6. The spring member 4 comprises a pair of coiled springs 40, 41. The force of these springs biases the support assembly 2 obliquely downward through a holder 42, whereby the assembly 2 is subjected to a clockwise moment about the lower end 511.

The side wall 52 is formed at a suitable position with a screw hole 57 (mentioned above) which is internally threaded. When the pivot member 54 is tightly screwed into the hole 57 through the screw hole 26, the adjusting member 5 is fixed to the support assembly 2.

In corresponding relation to the screw hole 57 in the side wall 52, the side wall 53 has a screw hole 58 with a diameter larger than the outside diameter of the pivot member 55. The pivot member 55 fixed to the screw hole 27 loosely extends through the hole 58.

When the pivot member 54 through the screw hole 26 is loosely screwed into the screw hole 57, with the pivot member 55 through the screw hole 27 loosely inserted through the screw hole 58, the adjusting member 5 is connected to the body-side support assembly 2 by the pivot members 54, 55 movably about these members. The base 50 has at a suitable portion a slot 59 elongated lengthwise of the base 50. The adjusting bolt 56 is loosely inserted through the slot 59 with a spring washer or the like provided on the bolt. When the ADF 7 is lowered as supported by the lower end 511 of the positioning portion 51, with the adjusting bolt 56 loosened as will be described later, the adjusting member 5 is tiltable as supported by the pivot members 54, 55 so that the base 50 is always in contact with the head of the adjusting bolt 56.

The pivot member 54, when tightly screwed into the hole 57, fastens the adjusting member 5 to the body-side support assembly 2.

The adjusting member 5 may be made pivotally movable relative to the support assembly 2 at all times by using rivets or the like as the pivot members 54, 55 and loosely inserting the pivot member 54 through the screw holes 26, 57 and the pivot member 55 through the screw holes 27, 58.

The clearance between the body 6 and the ADF 7 is adjustable by screwing the adjusting bolt 56 into the screw hole 25 in the support assembly 2 by a specified amount. The slot 59 guides the adjusting bolt 56 so that the bolt 56 will not be bent when loosened to tilt the adjusting member 5.

Figure 2:
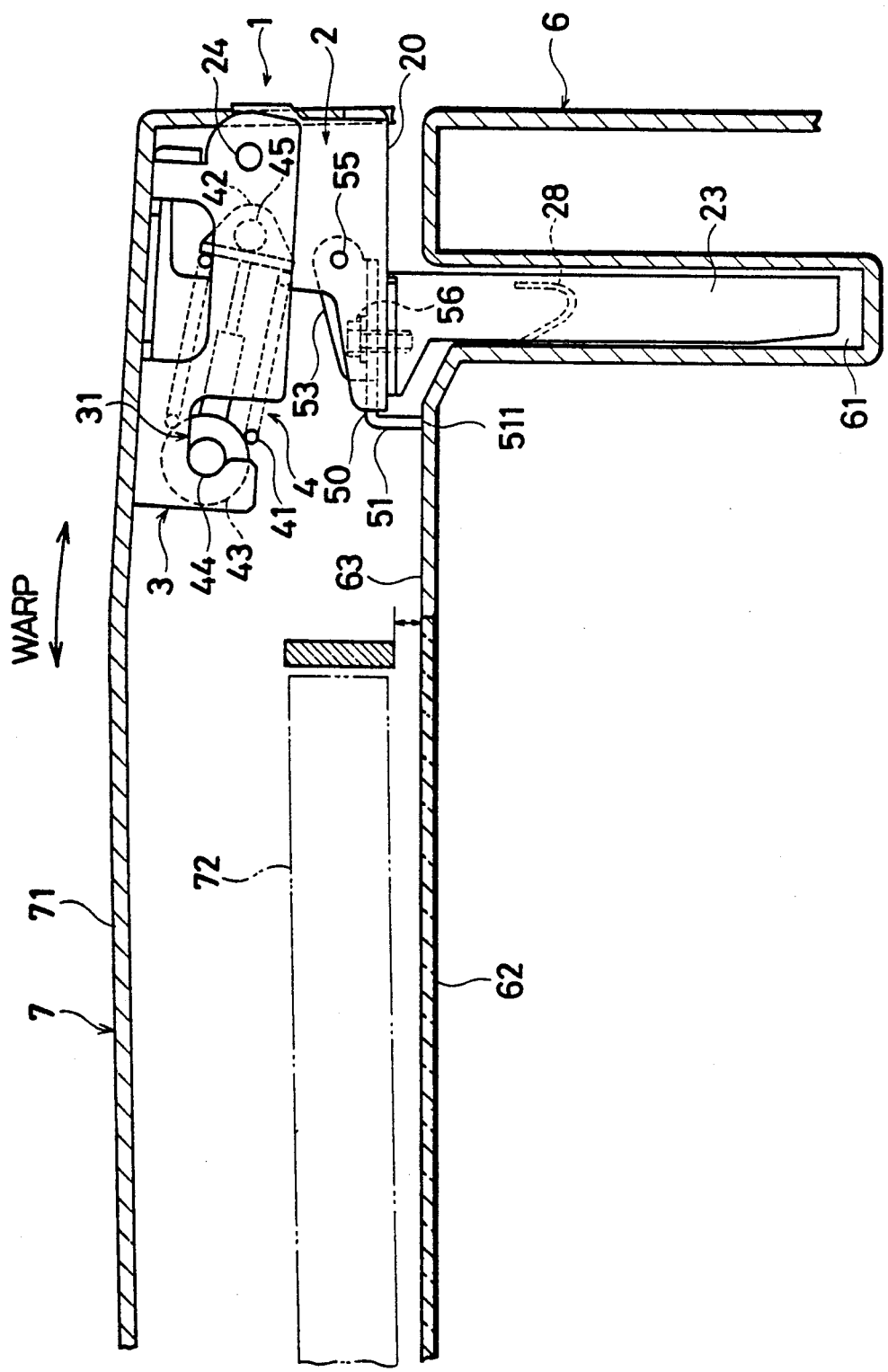
FIGS. 2 and 3 are views for illustrating the operation of the opening-closing mechanism of FIG. 1.

For example when the ADF 7 is mounted on the body 6 with the adjusting bolt 56 tightened up as seen in FIG. 2, the force of the coiled springs 40, 41 biases the ADF 7 upward to warp the cover 71, whereby one side of the conveyor belt 72 toward the mechanism 1 is raised off the glass platen 62. When the adjusting bolt 56 is loosened from above with the mechanism 1 opened in this state, the post 23 lowers along the mount cavity 61 owing to a clockwise moment about the lower end 511 of the positioning portion 51. The pivot 24 supporting on the support assembly 2 the ADF-side support portion 3 attached to the cover 71 therefore lowers, with the result that the cover 71 lowers at its one side where the mechanism 1 is provided.

Figure 3:
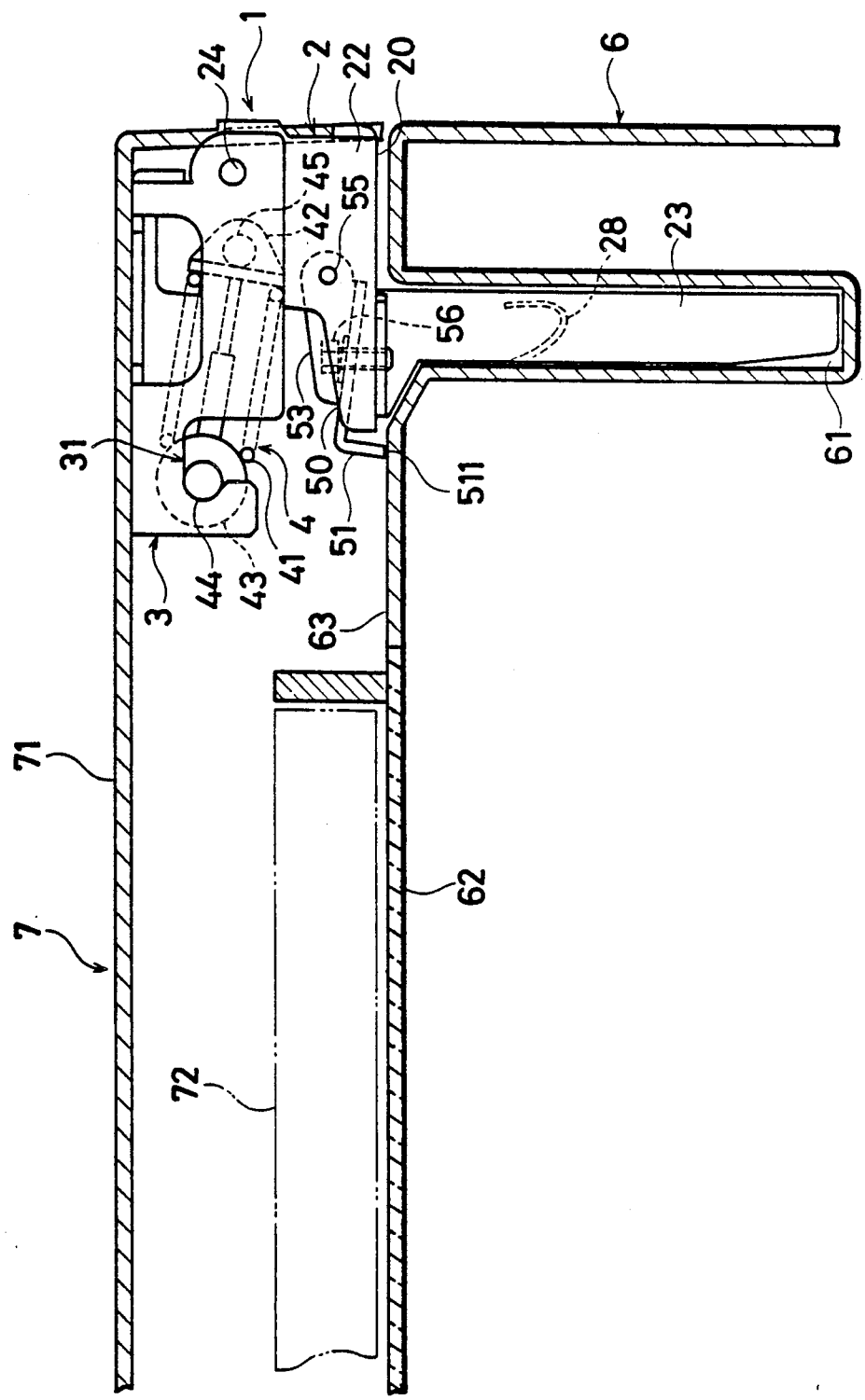
Figure 4:
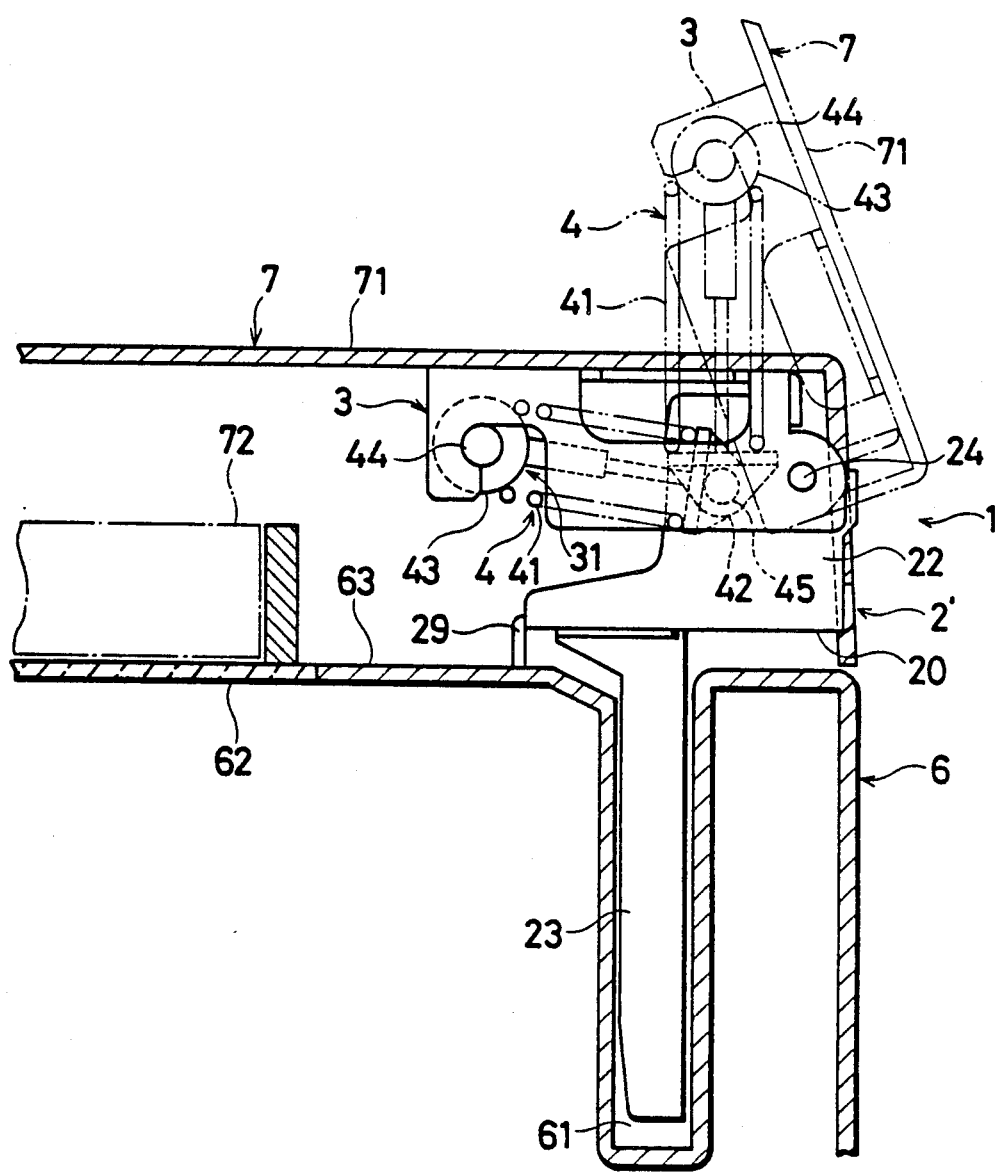
FIGS. 4 and 5 are views showing the construction of a conventional ADF opening-closing mechanism.
Figure 5:
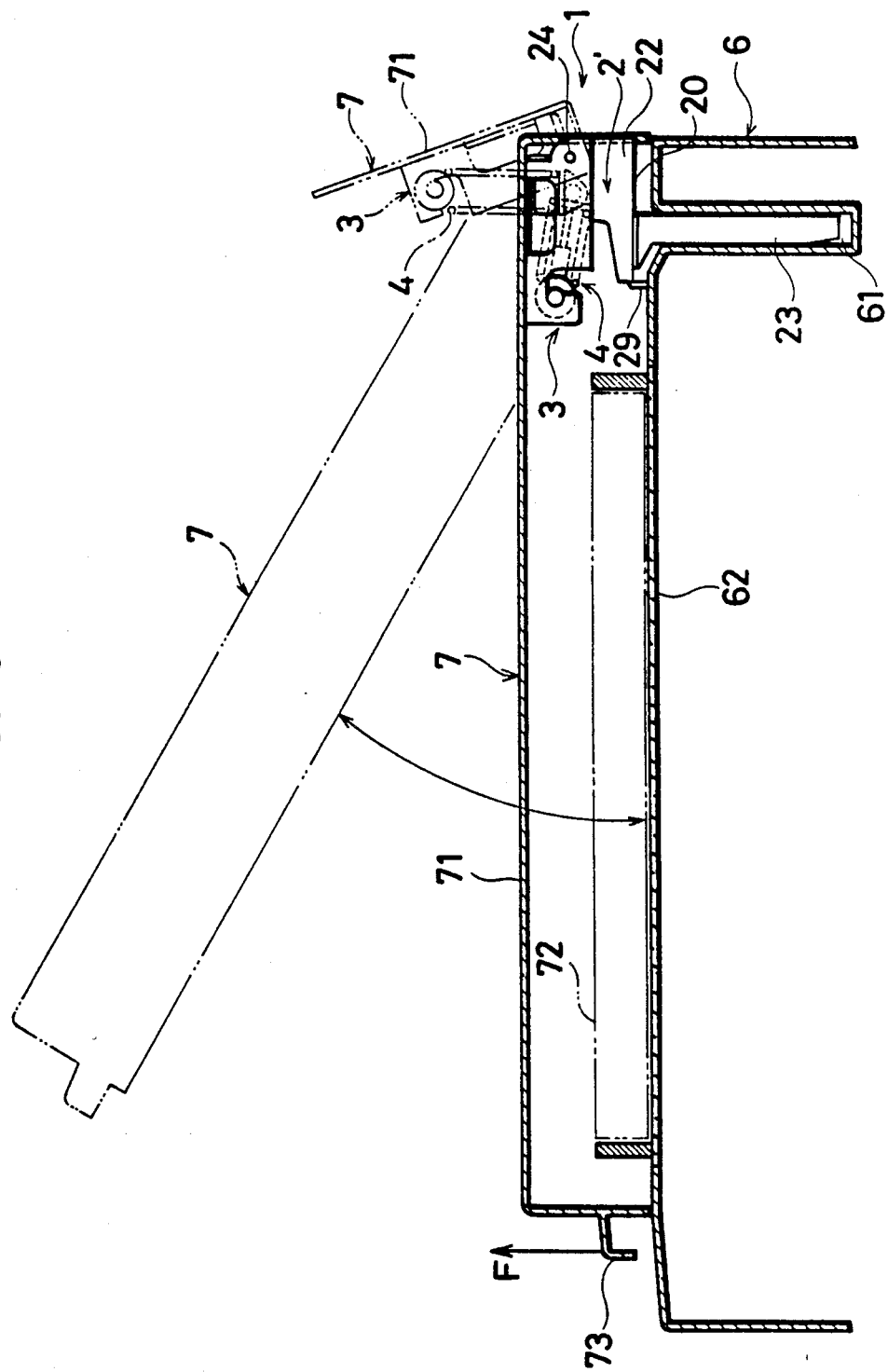
Figure 6:
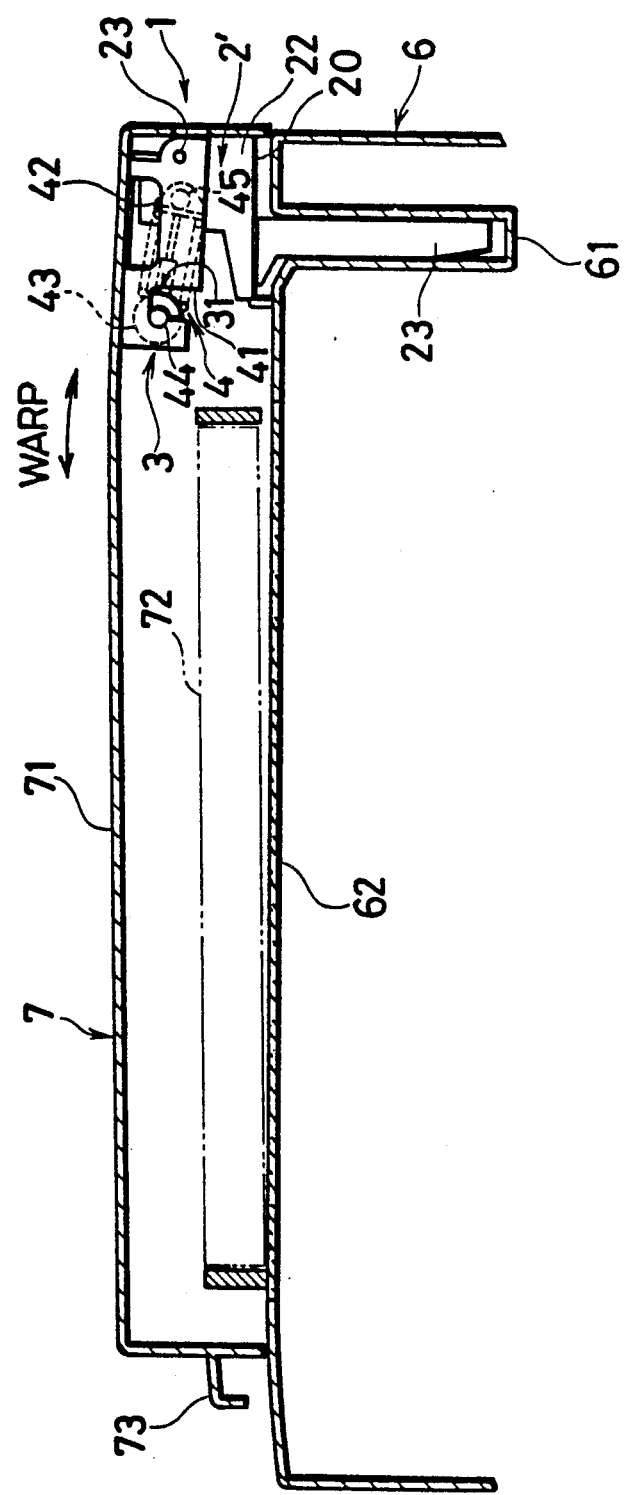
FIG. 6 is a view for illustrating the problem encountered with the conventional ADF opening-closing mechanism.

The adjusting bolt 56 is so adjusted that the document conveyor belt 72 will be positioned in parallel to the glass platen 62 when the ADF 7 is closed as seen in FIG. 3.

Since the adjusting bolt 56 can be thus loosened from above for adjustment after opening the mechanism 1 with the ADF 7 mounted on the body 6, the conveyor belt 72 can be positioned in parallel to the body 6 by a simple procedure. Furthermore, the opening-closing mechanism 1 can be produced at a low cost because the adjusting member 5 has a relatively simple construction.

Although the present invention has been fully described by way of example with reference to the accompanying drawings, it is to be understood that various changed and modifications will be apparent to those skilled in the art. Therefore, unless otherwise such changes and modifications depart from the scope of the invention, they should be construed as being included therein.

What is claimed is:

1. A mechanism for opening and closing an automatic document feeder comprising: support means including:
   a body-side support portion having a post removably insertable into a mount cavity in the body of an apparatus,
   a feeder-side support portion for holding the automatic document feeder;
   a pivot member provided on the body-side support portion for pivotally movably supporting the feeder-side support portion; and
   a spring member provided between the body-side support portion and the feeder-side support portion for biasing the feeder-side support portion upward;
   regulation means for regulating the distance between the pivot member of the body-side portion and the body of the apparatus, the regulation means including:
   a movable support member movably provided between the body-side support portion and the body of the apparatus for supporting the support means, and
   an adjusting member for adjusting the position of the movable support member; whereby the distance between the pivot member of the body-side supporting portion and the body of the apparatus is regulated by adjusting the portion of the movable support member by the adjusting member.

2. The mechanism of claim 1 further comprising an elastic member interposed between the post and the wall of the body defining the mount cavity for pressing the post into contact with the cavity-defining wall.

3. The mechanism of claim 1 wherein the movable support member is pivotably attached to the body-side support portion.

4. The mechanism of claim 3 wherein the movable support member has an opening, and the adjusting member includes a stopper member formed with a flange portion having a width greater than the width of the opening, and a stem portion having a width smaller than the width of the opening, the stem portion extending through the opening and rotatably attached to the body-side support portion, whereby the stopper member is rotated so as to stop the movable support member at a desired position with the flange portion.

5. The mechanism of claim 2, wherein the elastic member is a plate spring, and the post has a U-shaped cross section, a part of the plate spring is placed in the post.

* * * * *